(12) United States Patent
Day et al.

(10) Patent No.: US 10,863,834 B2
(45) Date of Patent: Dec. 15, 2020

(54) INTERACTIVE TABLET AND SHELF

(71) Applicant: NCR Corporation, Duluth, GA (US)

(72) Inventors: Phil Noel Day, Fife (GB); Steven James Birnie, Dundee (GB); Marshall Munro, Dunfermline (GB); Andrew William Douglas Smith, Dundee (GB)

(73) Assignee: NCR Corporation, Atlanta, GA (US)

( * ) Notice: Subject to any disclaimer, the term of this patent is extended or adjusted under 35 U.S.C. 154(b) by 84 days.

(21) Appl. No.: 16/023,027

(22) Filed: Jun. 29, 2018

(65) Prior Publication Data

US 2020/0000249 A1  Jan. 2, 2020

(51) Int. Cl.
| | |
|---|---|
| *G06K 7/00* | (2006.01) |
| *A47F 9/04* | (2006.01) |
| *G06Q 20/20* | (2012.01) |
| *G06K 9/00* | (2006.01) |
| *G06Q 20/40* | (2012.01) |

(52) U.S. Cl.
CPC .............. *A47F 9/048* (2013.01); *A47F 9/042* (2013.01); *G06K 9/00671* (2013.01); *G06Q 20/204* (2013.01); *G06Q 20/208* (2013.01); *G06Q 20/40145* (2013.01)

(58) Field of Classification Search
USPC ................................ 235/435, 439, 454, 462
See application file for complete search history.

(56) References Cited

U.S. PATENT DOCUMENTS

| | | | |
|---|---|---|---|
| 9,697,548 B1 * | 7/2017 | Jaff ..................... | G06Q 30/0601 |
| 2016/0379082 A1 * | 12/2016 | Rodriguez ............. | G01C 21/20 |
| | | | 382/100 |
| 2017/0076269 A1 * | 3/2017 | Saeed ................ | G06Q 20/3224 |

FOREIGN PATENT DOCUMENTS

WO    WO-2017112132 A1 *  6/2017  ............. G06Q 30/02

* cited by examiner

*Primary Examiner* — Matthew Mikels
(74) *Attorney, Agent, or Firm* — Schwegman, Lundberg & Woessner

(57) ABSTRACT

Disclosed are systems and methods for completing a transaction using a shelf and interactive tablet. The systems and methods may include receiving, at an interactive tablet comprising a processor, a captured image associated with an item; identifying, by the interactive tablet, a known image of the item based on the captured image of the item; and retrieving, by the interactive tablet, product information associated with the item based on the known image of the item.

19 Claims, 4 Drawing Sheets

INTERACTIVE TABLET AND SHELF

SUMMARY

Disclosed are systems and methods for completing a transaction using a shelf and interactive tablet. The systems and methods may include receiving, at an interactive tablet comprising a processor, a captured image associated with an item; identifying, by the interactive tablet, a known image of the item based on the captured image of the item; and retrieving, by the interactive tablet, product information associated with the item based on the known image of the item.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
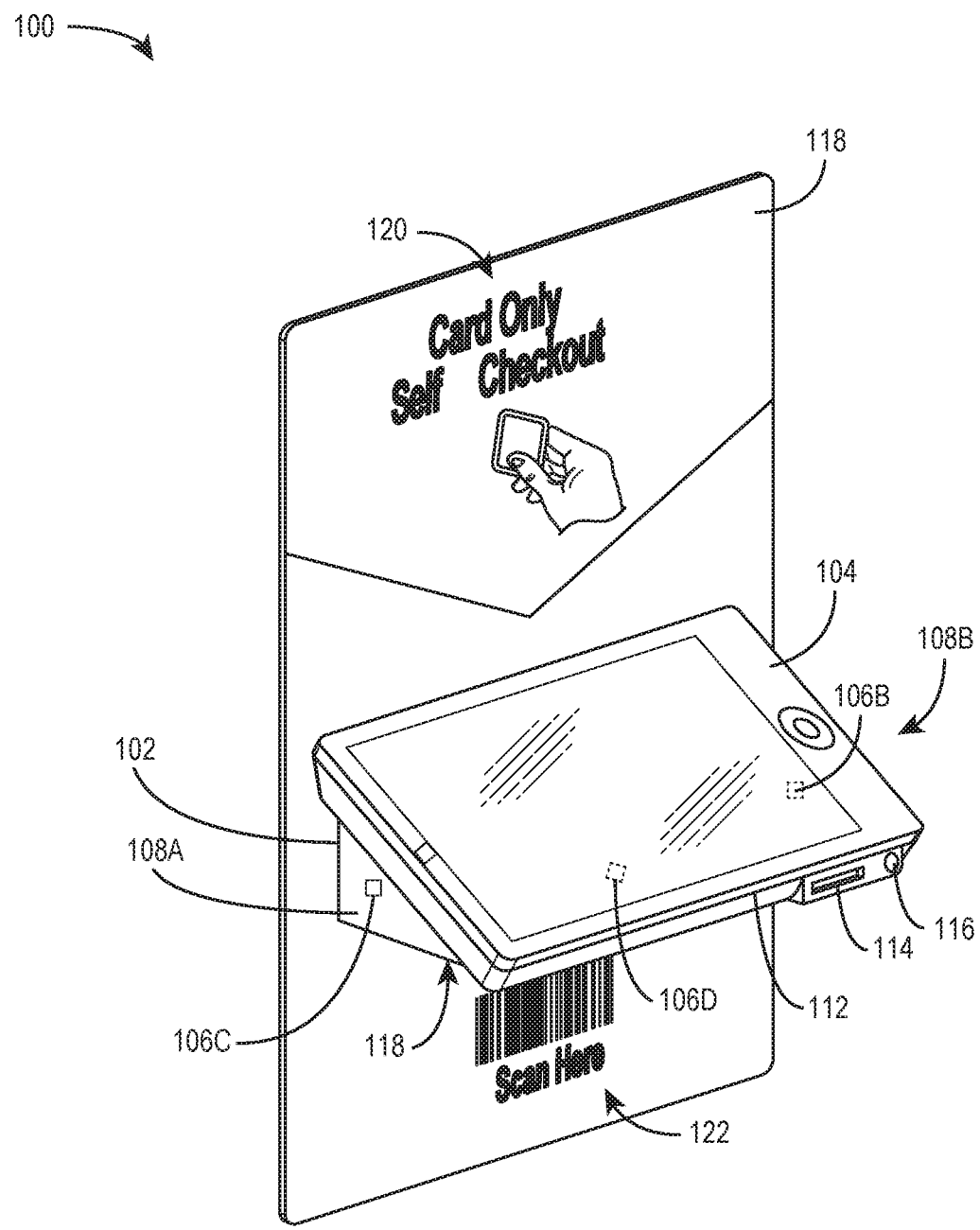
FIG. 1 shows an example shelf and interactive tablet consistent with this disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the disclosed systems. Accordingly, the following detailed description does not limit this disclosure. Instead, the proper scope of any invention disclosed herein is defined by the appended claims.

Self-service terminals such as automated teller machines (ATMs) or self-checkout machines (SCOs) may have interaction and authentication elements integrated into a fascia along with other media handling devices such as card readers, dispensers, depositories, printers, etc. This can mean that locating interface elements can be confusing for first time users, particularly with products that have many features such as, for example, a SCO configured with note and coin recycling. In addition, if one of the elements needs replacing, it can be a complex and difficult operation, resulting in having to take the machine out of service and sometimes, any adjacent machines, for a significant period of time, resulting in loss of revenue.

As disclosed herein, a single tablet or other computing device may perform multiple authentication and identification functions; and input/output modules may be integrated into this single tablet. Modules may include, but are not limited to, an encrypted touchscreen, contactless reader for both cards and nearfield communication (NFC) enabled smart devices, biometric security devices (e.g., facial recognition, fingerprint, palm print, etc.), private audio lead through (either through a conventional 3.5 mm analogue audio socket, or through wireless audio transmission such as Bluetooth, Wi-Fi, or another transmission medium to send audio to remote headphones or smart devices).

As disclosed herein, a single, unified, device may allow multiple authentication, identification, and input/output modules to be integrated as a single element. Modules include, but are not limited to, an encrypted touchscreen offering leadthrough to the consumer along with accepting input, identification devices (e.g., contactless readers for both cards and NFC enabled smart devices, partial dip card readers), biometric identification devices (e.g., facial recognition, fingerprint, palm print, etc.), and accessibility features. Examples of accessibility features may include, but are not limited to, private audio, either through a conventional 3.5 mm analogue audio socket, or through wireless audio transmission such as Bluetooth, Wi-Fi or another transmission medium to send audio to remote headphones or smart devices. The modules may be solid-state and thus, have no moving parts. For example, encrypted touchscreens, contactless or wireless audio and/or payment methods, etc. may be modules that are solid state and have no moving parts. Thus, the interactive tablet disclosed herein, may be less prone to part failure because there are no moving parts within the interactive tablet.

The interactive tablet disclosed herein may be plugged securely into a SCO interface regardless of configuration. As a result, the same interactive tablet may be used across all SCOs variants from a minimal cashless system, (i.e., card only SCOs with no weigh scale) up to fully featured wide SCOs with note and coin recycling, scanner, and weigh scale.

The solid-state design of the interactive tablet may permit it to be configured in three ways—as a left, right, or centered cantilever, which may enable different installation orientations that may be required by different customers. The interactive tablet may have a high level of modularity so that it may serve as a common component in multiple different orientations for different configurations. The ability to be operate in different orientations and configurations may afford a broad level of adaptability of design thus providing benefits that include, but are not limited to, commonality, cost saving, reduced parts count, operational benefits, etc. In addition, the end-user, by means of a streamlined, consistent user interface with all related modules being in a single area, may enjoy increased usability as well as decreased time spent using the interactive tablet. For example, by providing a consistent user interface, users that speak/read different languages may still be able to use the interactive tablet because all of the components will operate the same and soft buttons for using the interactive tablet may be in a consistent location.

As disclosed herein, the interactive tablet may support provisions for a scanner/imager to be in several different locations, thus enabling different installation, placement and experiential options. For example, the scanner/imager may be able to scan/capture images underneath or above the interactive tablet. The scanner/imager module may point to the left or right of the interactive table to capture images. In addition, because the interactive tablet may have multiple scanner/imager modules, such as cameras, the interactive tablet may be able to scan/capture images in multiple directions simultaneously. For example, using multiple scanner/imager modules, the interactive tablet may be able to capture images from both beneath and to the right and left of the interactive table simultaneously.

The various scanner/imager locations disclosed herein, also offer additional security benefits. As a result, it may be that imagers, such as cameras, are placed in multiple locations to exploit these security benefits, even in locations that would not use the imager for scanning goods. For example, one security benefit may be afforded by having a camera looking forward and up towards the user. The camera may capture images of the user without displaying them on screen so as to provide an additional security feed, or to provide an audit trail, or to be used as identification/verification. In another example, the image feed from the camera may also be displayed on screen so the user can see themselves. In another example, a mirror may be placed proximate a portion of the interactive tablet. The mirror could be used in addition to, or instead of cameras to give the user the impression he or she is being watch, and thus, the user may be less likely to engage in dishonest behavior.

Another security benefit may be afforded is by having cameras face multiple directions—either down below the interactive tablet, or to the side (depending on where the bagging area is placed). The feed of the cameras could be used along with image processing software to disambiguate when items are scanned and placed in the bag. For example, using image analysis a simple edge detection may be done on items to detect that an item has been moved across the field of view. Stated another way, using the images from the cameras and image analysis, determining when a scanned item moves from the scanning area to a bagging area may be performed. In another example, the cameras and image analysis may be used to detect both edges and determine that bagged items remain in the bag. Yet another example may include using image analysis to recognize produce and packaging labels to identify the items, or at least to give a level of probability that the item scanned is being placed in the bag. For instance, a user may scan bananas and the image analysis module may utilize images from a camera to determine that an item placed in the bag or bagging area has a color ranging from light green to yellow. If an item of a different color is placed in the bagging area, the interactive tablet may transmit a notification to an attendant or other loss prevention personnel to more closely monitor the customer or otherwise verify the customer's actions.

As disclosed herein, downward-looking cameras can also be used on the interactive tablet, along with displaying a flipped view from the camera on the display, to make the interactive tablet appear transparent. In other words, the use of the cameras may allow the user to have the perception of seeing through the interactive tablet. This may be useful for helping people to learn the correct scan behavior, by overlaying guidance cues and other useful information over the view from the camera, or may also be an additional reminder that there are cameras tracking activity, thus, providing a subtle reinforcement and cue to good behavior.

These features can be combined to provide a more complete system of tracking and inferring whether it is likely that fraudulent activity has been detected or not. However, it may be that the experience of security triggered interventions is not desirable (e.g., unexpected item in bagging area)—the systems and methods disclosed herein may use a user's credentials (e.g., payment method, loyalty token, picture of the user, etc.) to retrospectively interrogate and flag for future investigation.

Another benefit that the interactive tablet disclosed herein affords is that of a more sophisticated experience—the look and feel of integrating all input, payment and verification modules into a cohesive tablet is a departure from currently SSTs, ATMs, and SCOs.

As disclosed herein, the interactive tablet may be situated on a shelf that may be mounted to a wall or other fixture within a retail environment. For example, the cameras, scanners, and other modules may be located within or otherwise affixed to the shelf along with the interactive tablet. The shelf may allow the cameras and interactive tablet to be arranged in a given orientation as disclosed herein. The tablet/shelf approach disclosed herein also offers the significant benefit of reducing the vertical height of the entire display when compared to existing self-service designs both in terms of SCOs and other industries like ATMs. In addition, the shelf may allow the interactive tablet to be arranged at an angle of about 25° to about 35°. The angle may allow for a depth reduction as compared to existing SCOs designs (e.g., where touchscreen and payment is placed above and behind the scanner/weigh scale area), which also significantly improves the accessibility of the solution, meaning that more people can use the self-checkout aisle, by including both ambulant and seated people such as wheelchair users.

As disclosed herein, the shelf and interactive tablet may allow for the integration of many features either immediately adjacent to, or integrated within, the area of the on-screen information of the display, which can be more effectively used to guide the user in how to use each element. For instance, in one example a contactless/NFC reader may be behind the display, the target area, and any feedback as to a read/write operation, can all be shown to the user on the display. In this configuration, there is no need for extra lighting or indicators to guide attention to the correct area for completing a task. Similarly, the payment or input controls may only be visible when needed and can seamlessly be blended in to the entire experience; rather than having a physical keypad that is always visible.

The general form and layout of the interactive tablet also may enable more detailed and helpful feedback and leadthrough to be conducted on the display. For example, the shelf and interactive tablet may place the scanner/imager in much closer proximity to the display, thus meaning that more effective use can be made of the display. In one possible implementation, this could mean that a local area of the display can be used to show that a scan has been successful (i.e., without a beep and flash, which are conventionally used to indicate a successful scan), with other parts of the display providing more detailed information about this update (e.g. an animation to show the rolling receipt growing, with the item that was just scanned showing up as the last or as an emphasized item). In addition, the display can be used to draw attention to modules around the display, thus providing additional leadthrough (e.g. for those edge cases that still require physical receipt, the user can be guided to where the receipt printer might be located).

Turning now to the figures, FIG. 1 shows an example shelf 102 and interactive tablet 104. As shown in FIG. 1, shelf 102 may include a camera 106A mounted in a side panel 108A, a camera 106B mounted in a side panel 108B, a camera 106C mounted in a bottom panel 110, and a cameral 106D mounted in a top panel 112. Camera 106D may also be a component of the interactive tablet 104. The side panels 108A and 108B may be collectively referred to as side panels 108. Cameras 106A, 106B, 106C, and 106D may be collectively referred to as cameras 106. Shelf 102 may also include a card reader 114 and an audio socket 116.

As shown in FIG. 1, interactive tablet 104 may be arranged at an angle relative to bottom panel 110. The angle may range from about 25° to about 35°. The inclined orientation of interactive tablet 104 may allow a footprint of the shelf 102 and interactive tablet 104 to be minimized and provide for user comfort as disclosed herein. In addition, the inclined orientation of interactive table 104 allows the sides 108, bottom panel 110, and interactive tablet 104 to define a cavity to house the various modules that may interface with interactive tablet 104. The various modules may interact with interactive tablet 104 via wired or wireless connections as disclosed herein.

FIG. 1 also shows that self 102 and interactive tablet 104 may be mounted to a panel 118. Panel 118 may be mounted to a wall, a post, or other support member. Panel 118 may also be a standalone item. Panel 118 may include text 120 that may provide and indication to a user. For example, as shown in FIG. 1, text 120 may provide an indication that interactive tablet 104 may only be used by users that a using a card or other cashless form of payment for checkout. Text 120 may be illuminated to provide additional indications. For example, text 120 may be illuminated, via backlighting, to indicate that interactive tablet 104 is open and available for use.

Panel 118 may also include text 122. Text 122 may provide directions for a user. For example, text 122 may indicate an area where a user may place items that are to be scanned. For instance, as shown in FIG. 1, by placing items proximate text 122, the item may be in view of camera 106D and can then be scanned.

Text 120 and text 122 may be projected onto panel 118. For example, a projector module may be contained within shelf 102 and may project text 120 and text 122. Using a projector module may allow text 120 and text 122 to be customized. For instance, by projecting text 122, the language may changed depending on a language selected by a user. For example, if a user selects German, text 122 may be change from "Scan Here" to "Hier Scannen."

Figure 2:
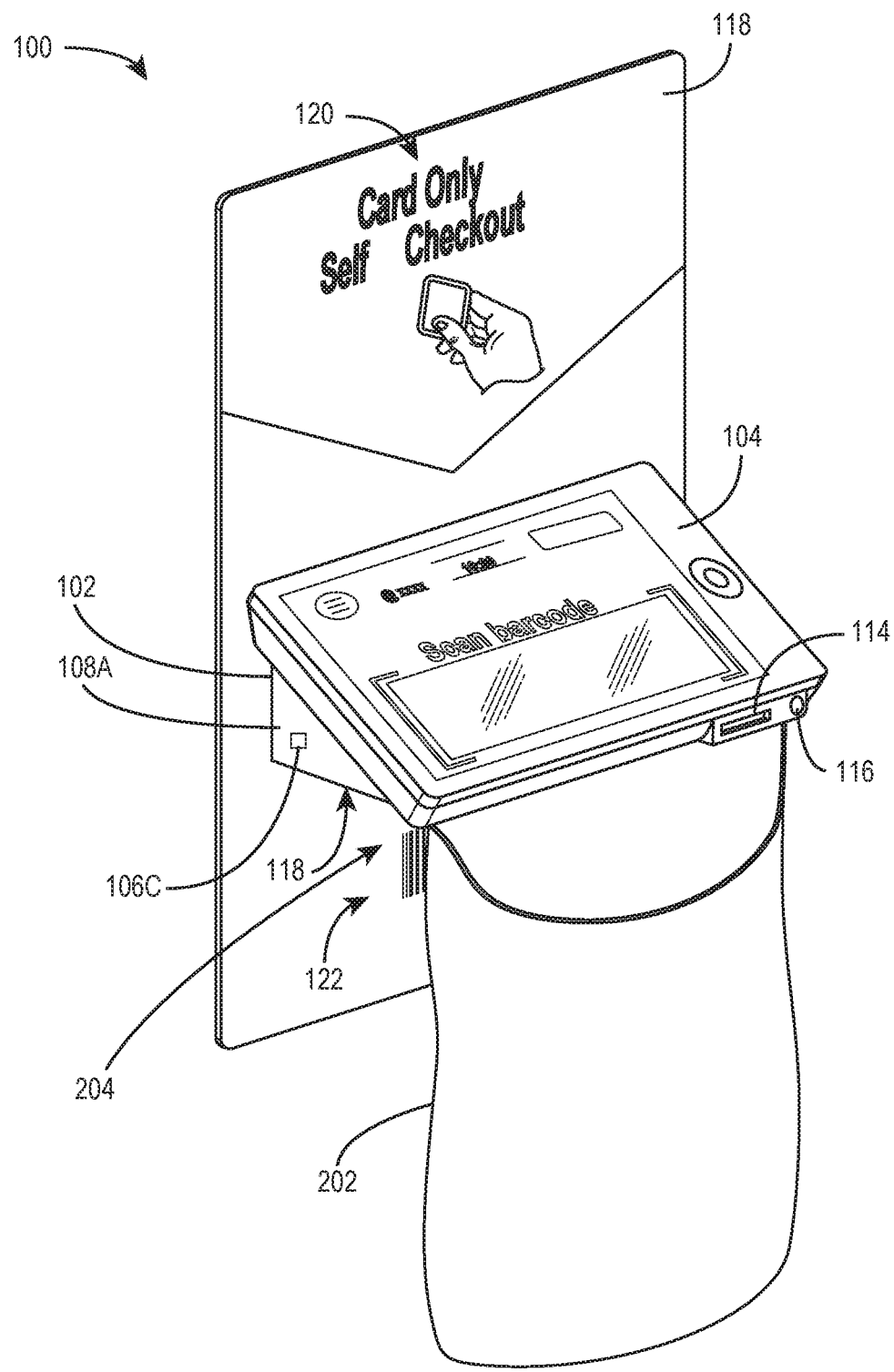
FIG. 2 shows an example shelf and interactive tablet consistent with this disclosure.

FIG. 2 shows shelf 102 and interactive tablet 104 with a bag 202 suspended underneath shelf 102. Bag 202 may be suspended from a hook 204. Hook 204 may be connected to a piezoelectric member or other module that may transmit a signal to interactive tablet 104. The signal may indicate a weight of an item or combined weight of items located in bag 202. As a result, hook 204 may act as an antitheft device by allowing a known weight for scanned items to be compared to a weight sensed by hook 204.

In addition, camera 106D may be used as an antitheft device. For example, as items are scanned by camera 106D, camera 106D may track the items until the are placed in bag 202. In addition to be located underneath shelf 102, bag 202 and/or hook 204 may be located on either side of shelf 102 or above shelf 102. Items may still be scanned underneath shelf 102 by camera 106D and placed in bag 202 that is located on a side of shelf 202. For example, items may be scanned underneath shelf 102 by camera 106D and as the items are moved to bag 202, which is located on a side of shelf 102 for this example, cameras 106B or 106C may track the items until they are placed in bag 202.

While a user is scanning items, interactive tablet 104 may display an outline of where a barcode or other identifying information should be located so that interactive tablet 104 can read the barcode or other identifying information. Text or other information may also be displayed on the display of interactive tablet 104. The text or other information may provide instructions to the user as to how to operate interactive tablet 104.

Figure 3:
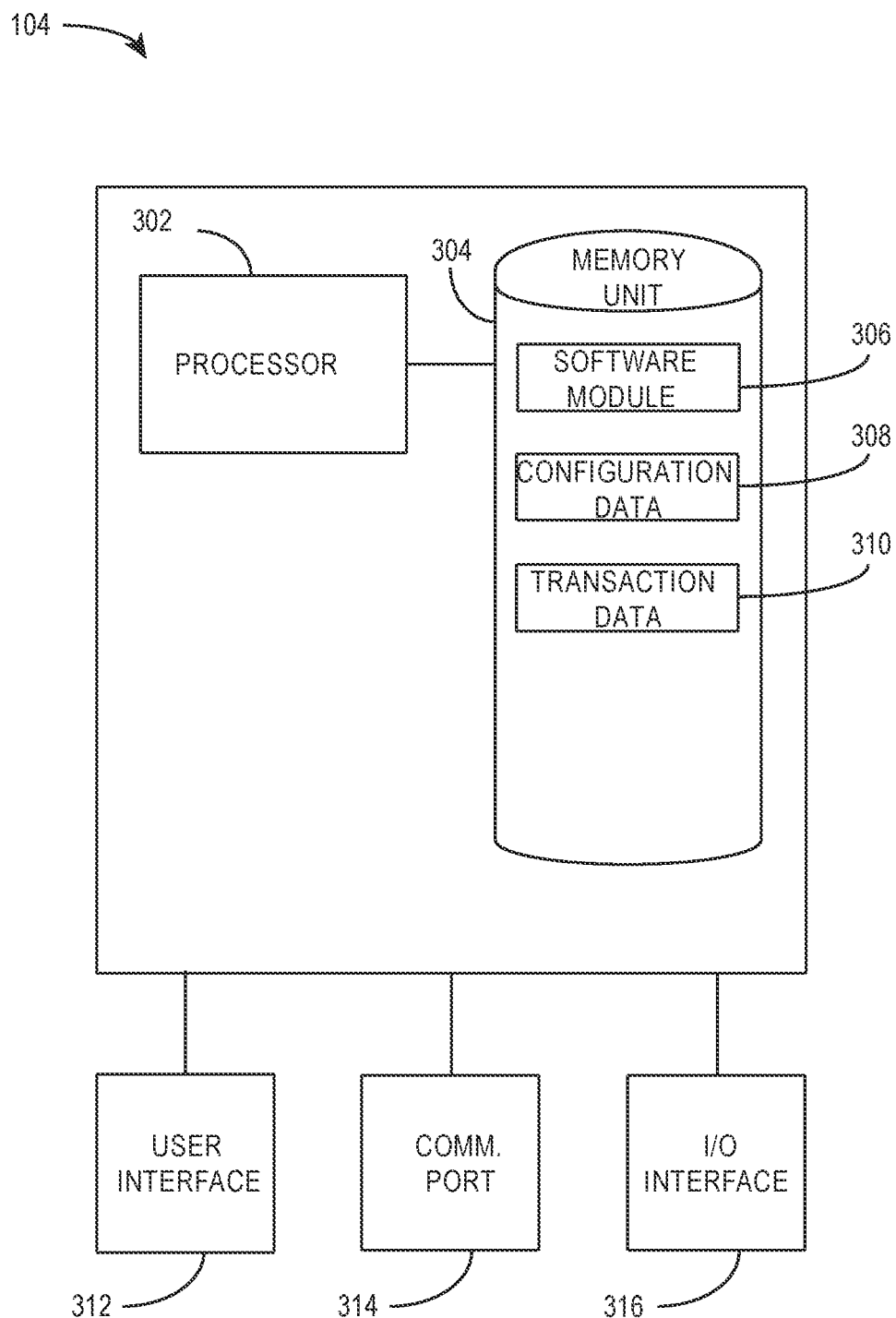
FIG. 3 shows an example schematic of a shelf and interact table consistent with this disclosure.

FIG. 3 shows an example schematic of interactive tablet 104 consistent with embodiments disclosed herein. As shown in FIG. 3, interactive tablet 104 may include a processing unit 302 and a memory 304. Memory 304 may include a software module 306, configuration data 308, and transaction data 310. While executing on processing unit 302, software module 304 may perform processes for verifying modules and completing a transaction, including, for example, one or more stages included in a method 400 described below with respect to FIG. 4. Interactive tablet 104 may also include a user interface 312, a communications port 314, and an input/output (I/O) device 316.

As disclosed herein, configuration data 308 may include data regarding configuration of interactive tablet 104. For example, configuration data may include drivers or other software that is needed for interactive tablet 104 to communicate with and operate various peripheral devices that may be connected to interactive tablet 104. For instance, drivers for all peripheral devices a manufacture may support may be preloaded onto memory unit 304. As such, when a peripheral device supported by the manufacture is detected by interactive tablet 104, the appropriate driver may be retrieved from configuration data 308 and used to operate the peripheral device. Configuration data 308 may also include data retrieved from a remote computing device (not shown). For example, when interactive tablet 104 detects a peripheral device, interactive tablet 104 may request an appropriate driver from a server maintained by the manufacturer of the peripheral device or interactive tablet 104. Once received, the driver may be stored in memory unit 304 as configuration data 308.

Configuration data 308 may include other information such as encryption keys that may be used to allow communications between interactive tablet 104 and peripheral devices to be encrypted. For example, user interface 312 may include an encrypted display and the private key for user interface 312 may be stored as configuration data 308.

Transaction data 310 may include information related to the various transactions executed by or that could be executed by interactive tablet 104. For example, transaction data 310 may include user data such a credit/debit card information, a username, personal identification number (PIN), loyalty program information, etc. Transaction data 310 may also include barcode and other information about products that are being purchased. For instance, when a user scans an item, information such as price, images that appear on the packaging, weight, and pathway from a scanner/image capturing device to a bagging area. For example, when a barcode on an item is scanned by camera 106D, a price, images from the packaging, and weight of the item may be retrieved. In addition, transaction data 310 may define an expected path the item should take from beneath shelf 102 to bag 202. Using the path data and know images of the item, interactive tablet 104 may use cameras 106 to track from the scanning area to bag 202. If for some reason images of the scanned item do not match known images or the item does not follow the expected path, then an alert may be transmitted to an attendant or other loss prevention personnel to inspect the transaction or otherwise monitor the costumer.

User interface 312 can include any number of devices that allow a user to interface with interactive tablet 104. Non-limiting examples of user interface 312 include a keypad, a microphone, a display (touchscreen or otherwise), etc.

Communications port 314 may allow interactive tablet 104 to communicate with various information sources and devices, such as, but not limited to, payment processing systems, remote computing devices, mobile devices of users, peripheral devices, etc. Non-limiting examples of communications port 314 include, Ethernet cards (wireless or wired), Bluetooth® transmitters and receivers, near-field communications modules, etc. In addition, interactive tablet 104 may include more than one communications port 314.

I/O device 316 may allow interactive tablet 104 to receive and output information. For example, I/O device 316 may include cameras 106, weight sensors or scales, such as hook 204. Non-limiting examples of I/O device 316 include, a camera (still or video) such as cameras 106, a printer, a scanner, scale or other weight sensor such as hook 204, etc.

Figure 4:
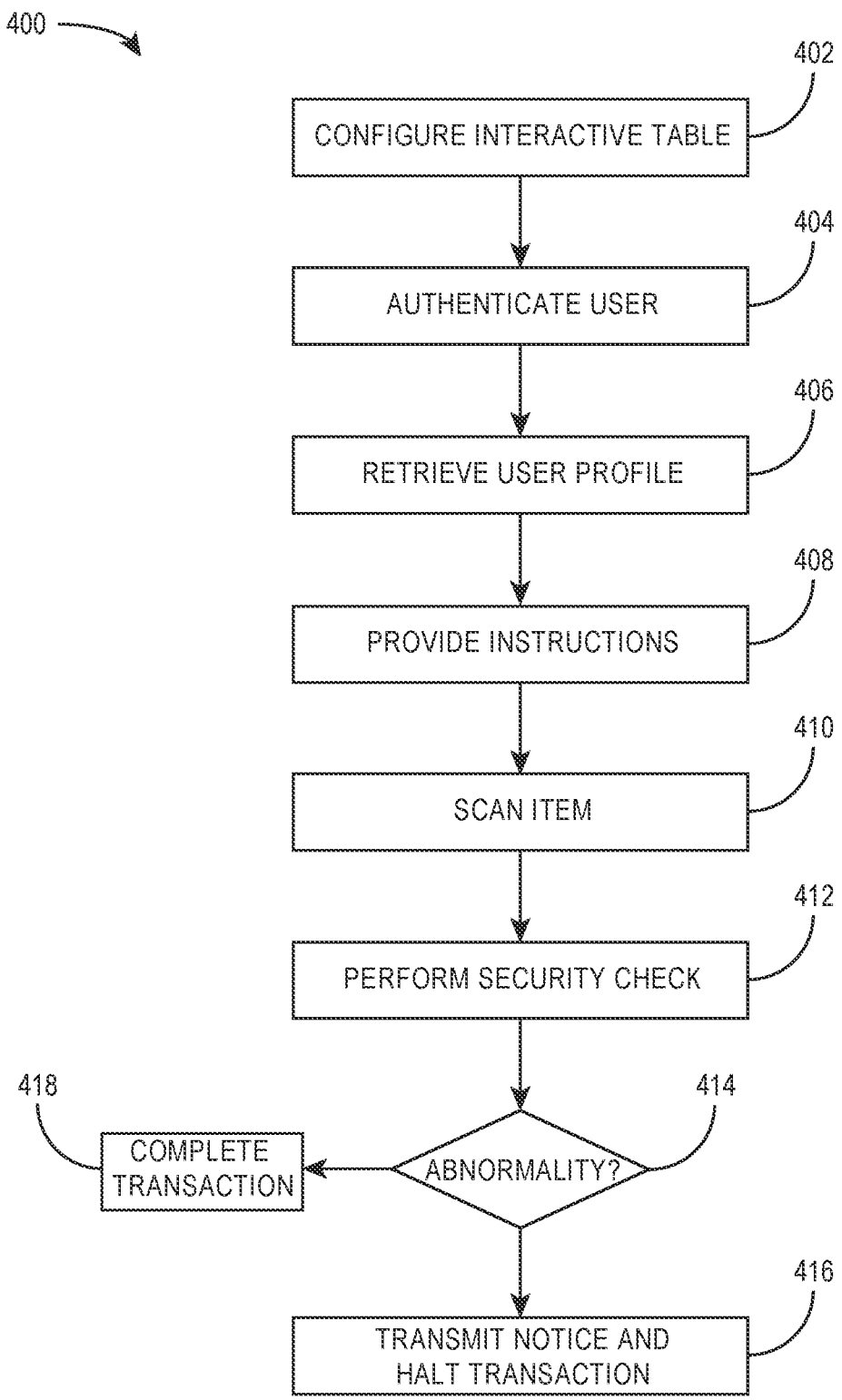
FIG. 4 shows an example method consistent with this disclosure.

FIG. 4 shows method 400 for authenticating peripheral devices and completing a transaction consistent with this disclosure. Method 400 may begin at stage 402 where interactive tablet 104 may be configured. Configuring interactive table 104 may include mounting self 102 on panel 118 and installing interactive tablet 104 on self 102. Mounting self 102 may include adjusting an angle of interactive tablet 104 relative to bottom panel 118.

Configuring interactive tablet 104 may also include interactive tablet 104 discovering or receiving information about peripheral devices that are to interact with interactive tablet 104. Once the peripheral devices are discovered or information identifying the peripheral devices is received, configuration data can be retrieved as disclosed herein and used to configured interactive tablet 104. Once interactive tablet 104 is configured transactions may be completed.

From stage 402 method 400 may proceed to stage 404 were a user may be authenticated. Authenticating the user may include receiving information about the user from a mobile device of the user. For example, the user's cellphone may be recognized by the interactive tablet 104 and identifying information such as a username and password or other secure token may be transmitted from the user's cellphone to interactive tablet 104. In another example, the user may be authenticated using facial recognition. For instance, when the user approaches shelf 102, camera 106C may capture an image of the user. The image may be compared with images of registered users to identify the user.

From stage 404 method 400 may proceed to stage 406 where a user profile may be retrieved. The user profile may include loyalty information as well as security protocol information. For example, the loyalty information may include a point balance, member number etc. so that the user may utilize any points, etc. The security protocol information may include information identifying the trustworthiness of the user. For example, if a user is a longtime customer that has never been suspected of shoplifting, then security measures such as measuring weights of items may be relaxed or otherwise disabled.

From stage 406 method 400 may proceed to stage 408 where instructions may be provided. For example, as disclosed herein, a display of interactive tablet 104 may display instructions for where the user should hold items to be scanned otherwise operate the interactive tablet 104. The instructions may also include instructions for a user to complete authentication from stage 404.

From stage 408 method 400 may proceed to stage 410 where items may be scanned. Scanning items may include capturing images as disclosed herein. For example, when an item is placed near one of cameras 106, a barcode and/or other images associated with the packaging may be captured. The images may be used to identify the items so that price and other information may be retrieved.

From stage 410 method 400 may proceed to stage 412 where security checks may be performed. The security checks may include determining that the user moved the item from the initial scanning area, such as proximate camera 106D to a bagging area, such as into bag 202. In addition, the cameras 106, or other cameras located proximate the self 102 and interactive tablet 104, may be used to capture images of items within the user's shopping cart. The images may be compared to known images of items, as well as an empty shopping cart, to determine if and what items the user may have in his or her shopping cart. As a result, interactive tablet 104 may be able to determine if a user is attempting to steal items by not scanning them and simply leaving them in his or her cart. In addition, using the scanned images, interactive tablet 104 may determine if a shopper is attempting to steal item by placing a barcode from a cheaper item onto the packaging of a more expensive item. For instance, a user may take a barcode from an item that only costs $2 and place it an item costing $200. However, the item costing $2 may have red packaging proximate the barcode and the $200 item may have blue packaging proximate its barcode. Image analysis performed by interactive tablet 104 may determine there is a mismatch of colors for the scanned barcode.

From stage 412 method 400 may proceed to decision block 414 where a determination may be made as to if there is an abnormality. As disclosed herein an abnormality may be an indication that there is potential theft or other problems with the transactions. If there is an abnormality method 400 may proceed to stage 416 where the transaction may be halted, and a notification sent to store personnel. For instance, a barcode may not be recognized by interactive tablet 104, but there may be no potential theft; it is simply an error. As a result, attention or assistance from store personnel may be needed. In response to the abnormality, a notification may be sent to store personnel. The store personnel can clear the error remotely or further investigate the situation as needed.

If there is not an abnormality, method 400 may proceed to stage 418 where the transaction may be completed. Completion of the transaction may include requesting and processing the user's payment method. In addition, completion of the transaction may include prompting the user for an email address to email a receipt or transmitting the receipt to the user's cellphone.

The various stages of method 400 need not be completed in the order presented in FIG. 4. In addition, all of the stages of method 400 need not be completed for every transaction. For example, configuring interactive tablet 104 (stage 402) need not be completed for every transaction. In addition, a user may not be authenticated for every transaction. For instance, a user may not have a user profile or may not be a member of any loyalty program. As a result, interactive tablet 104 may not be able to authenticate the user (stage 404) or retrieve a user profile (406). As a result, the user may simply begin scanning items and method 400 may begin at stage 408 where instructions are provided. In addition, if a user is authenticated, instructions may not be needed because the user is familiar with usage of interactive tablet 104. Thus, stage 408 may be omitted.

EXAMPLES

Example 1 is a method of completing a transaction, the method comprising: receiving, at an interactive tablet comprising a processor, a captured image associated with an item; identifying, by the interactive tablet, a known image of the item based on the captured image of the item; and retrieving, by the interactive tablet, product information associated with the item based on the known image of the item.

In Example 2, the subject matter of Example 1 optionally includes determining that an abnormality exists with the captured image; and transmitting an alert to a remote computer in response to determining that the abnormality exists.

In Example 3, the subject matter of any one or more of Examples 1-2 optionally include performing a security check based on the captured image.

In Example 4, the subject matter of any one or more of Examples 1-3 optionally include wherein identifying a known image includes performing image analysis on a plurality of known images and the captured image.

In Example 5, the subject matter of any one or more of Examples 1-4 optionally include configuring the interactive tablet to wirelessly communicate with a plurality of peripheral devices.

In Example 6, the subject matter of Example 5 optionally includes wherein the plurality of peripheral devices includes one or more cameras located within a shelf supporting the interactive tablet.

In Example 7, the subject matter of any one or more of Examples 1-6 optionally include authenticating a user of the interactive tablet.

In Example 8, the subject matter of Example 7 optionally includes wherein authenticating the user includes using facial recognition to identify the user.

In Example 9, the subject matter of any one or more of Examples 7-8 optionally include retrieving a user profile after authenticating the user.

In Example 10, the subject matter of any one or more of Examples 1-9 optionally include configuring the interactive tablet to provide instructions to a user in a selected language.

Example 11 is a system of completing a transaction, the system comprising: a processor; and a memory storing instructions that, when executed by the processor, cause the processor to: receive a captured image associated with an item, identify a known image of the item based on the captured image of the item; and retrieve product information associated with the item based on the known image of the item.

In Example 12, the subject matter of Example 11 optionally includes wherein the instructions, when executed by the processor, further cause the processor to: determine that an abnormality exists with the captured image; and transmit an alert to a remote computer in response to determining that the abnormality exists.

In Example 13, the subject matter of any one or more of Examples 11-12 optionally include wherein the instructions, when executed by the processor, further cause the processor to identify a known image includes performing image analysis on a plurality of known images and the captured image.

In Example 14, the subject matter of any one or more of Examples 11-13 optionally include one or more peripheral devices, wherein the instructions, when executed by the processor, further cause the processor to configure the processor to wirelessly communicate with the plurality of peripheral devices.

In Example 15, the subject matter of Example 14 optionally includes wherein the plurality of peripheral devices includes one or more cameras located within a shelf that supports an interactive tablet housing the memory and the processor.

Example 16 is a self-service terminal comprising: a shelf having a first side panel, a second side panel, and a bottom panel defining a cavity; an interactive tablet connected to the first side panel and the second side panel such that the interactive tablet is arranged at an angle relative to the bottom panel; and a first plurality of cameras located within the cavity defined by the shelf, the plurality of cameras electrically coupled to the interactive tablet in a wireless manner.

In Example 17, the subject matter of Example 16 optionally includes a panel, the shelf affixed to the panel, the panel include first text stating instructions for a user.

In Example 18, the subject matter of any one or more of Examples 16-17 optionally include a second plurality of cameras located exterior of the cavity, the second plurality of cameras arranged to view a bagging area.

In Example 19, the subject matter of any one or more of Examples 16-18 optionally include wherein at least one of the first plurality of cameras is arranged to view a bagging area.

In Example 20, the subject matter of any one or more of Examples 16-19 optionally include wherein the angle relative to the bottom panel is between about 25° to about 35°.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A method of completing a transaction, the method comprising:
    configuring an interactive tablet to provide instructions to a user in a language selected by the user;
    receiving, at the interactive tablet comprising a processor, a captured image of an item;
    identifying, by the interactive tablet, a known image of the item based on the captured image of the item; and
    retrieving, by the interactive tablet, product information for the item based on the known image of the item.

2. The method of claim 1, further comprising:
    determining that an abnormality exists with the captured image; and
    transmitting an alert to a remote computer in response to determining that the abnormality exists.

3. The method of claim 1, further comprising performing a security check based on the captured image.

4. The method of claim 1, wherein identifying the known image includes performing image analysis on a plurality of known images and the captured image.

5. The method of claim 1, further comprising configuring the interactive tablet to communicate with a plurality of peripheral devices via wired or wireless connections.

6. The method of claim 5, wherein the plurality of peripheral devices includes one or more cameras located within a shelf supporting the interactive tablet.

7. The method of claim 1, further comprising authenticating a user of the interactive tablet.

8. The method of claim 7, wherein authenticating the user includes using facial recognition to identify the user.

9. The method of claim 7, further comprising retrieving the user profile after authenticating the user.

10. A method of completing a transaction, the method comprising:
    receiving, at an interactive tablet comprising a processor, a first captured image and a second of an item, the first captured image being a barcode and the second captured image being an image of a packaging of the item;

identifying, by the interactive tablet, a known image of the item based on the first and second captured images of the item; and retrieving, by the interactive tablet, product information for the item based on the known image of the item.

11. The method of claim 10, further comprising:

determining that an abnormality exists with the first or second captured images; and transmitting an alert to a remote computer in response to determining that the abnormality exists.

12. The method of claim 10, further comprising performing a security check based on the first or second captured images.

13. The method of claim 10, wherein identifying the known image includes performing image analysis on a plurality of known images and the second captured image.

14. The method of claim 10, further comprising configuring the interactive tablet to communicate with a plurality of peripheral devices via wired or wireless connections.

15. The method of claim 14, wherein the plurality of peripheral devices includes one or more cameras located within a shelf supporting the interactive tablet.

16. The method of claim 10, further comprising authenticating a user of the interactive tablet.

17. The method of claim 16, further comprising retrieving a user profile after authenticating the user.

18. The method of claim 1, wherein the captured image is one of a plurality of captured images.

19. A method of completing a transaction, the method comprising:

authenticating, by an interactive tablet comprising a processor, a user of the interactive tablet;

retrieving, by the interactive tablet, a user profile after authenticating the user;

configuring, by the interactive tablet, the interactive tablet to provide instructions to a user in a pre-selected language selected by the user;

receiving, at the interactive tablet, a captured image of an item;

identifying, by the interactive tablet, a known image of the item based on the captured image of the item;

performing a security check based on the captured image; and retrieving, by the interactive tablet, product information for the item based on the known image of the item.

* * * * *